UNITED STATES PATENT OFFICE 3,258,397
Patented June 28, 1966

3,258,397
SUBSTITUTED ARYLNITRILE OXIDES AS
ANTHELMINTHIC AGENTS
Hans-Jurgen E. Hess, Groton, and James W. McFarland,
Lyme, Conn., assignors to Chas. Pfizer & Co., Inc.,
New York, N.Y., a corporation of Delaware
No Drawing. Filed Apr. 13, 1965, Ser. No. 447,873
9 Claims. (Cl. 167—53)

This invention relates to the use of novel compounds which are valuable therapeutic agents. More particularly, it is the object of this invention to provide useful chemotherapeutic agents valuable in the veterinary control of helminthiasis in domestic animals.

The compounds, hereinafter referred to as arylnitrile oxides, are represented by the following formulae:

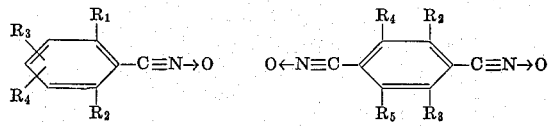

wherein $R_1$ is selected from the group consisting of alkyl having from 1 to 3 carbon atoms and alkoxy having from 1 to 3 carbon atoms;

$R_2$, $R_3$, $R_4$ and $R_5$ are each selected from the group consisting of hydrogen, alkyl having from 1 to 3 carbon atoms and alkoxy having from 1 to 3 carbon atoms.

Helminthiasis, the infestation of the animal body by various species of parasitic worms, is a very common and widespread disease affecting household and farm animals in all parts of the world. The economic significance of this disease is well known and has been the cause of extensive research on the control of helminthic parasites for many years. The effectiveness of the drugs used has not been entirely satisfactory for many reasons; e.g., limited anthelminthic spectrum, specificity of action, high cost and low activity.

Anthelminthic agents currently in commercial use are specific in their action both with respect to the helminth and to the host. The indiscriminate application of the term "anthelminthic" to drugs which have a toxic action upon parasitic worms belonging to more than one animal phylum, erroneously conveys the impression that the organism being acted upon belongs to a biological classification comparable to that which encompasses bacteria or fungi since these organisms are subject to attack by antibacterial and antifungal agents. However, this is not the case. Round worms and flat worms belong to different animal phyla and there is no reason to believe that an anthelminthic effective against *Ascaris lumbricoides* (phylum Nematoda) will have an effect on *Hymenolepsis nana* or *Taenia saginata* (phylum Platyhelminthes). Activity against one phylum cannot be extrapolated to another phylum.

Of the four major types of worms which infect domestic animals, two of them, the tapeworms and flukes, belong to the phylum Platyhelminthes or flat worms. The round worms or nematodes, belong to the phylum Nemathelminthes and the thorn-headed worms, which constitute the phylum Acanthocephala.

Tapeworms occur in all domestic animals. In the larval stage they are known as bladderworms and infect the liver, lungs, muscles and other organs of the cattle, sheep, swine, poultry, cats and dogs. These worms do a great deal of harm and can cause death with the resulting economic loss. Nematodes or round worms infect all parts of the animal body. They are parasites which cause anemia and which can also produce toxins harmful to the host animal. Nematodes produce trichinosis in man and animals; stomach worm disease in ruminants; nodular worm disease of sheep; filairisis in man, cattle and sheep; parasitic enteritis in all farm animals and many other serious diseases. The thorn-headed worms occur in swine and constitutes a serious threat to the livelihood of the farmer. The flukes cause serious injury and death to cattle, sheep and goats by infecting the livers of these animals.

Because of the serious economic significance of worm-infestation in domestic animals as well as the threat which these worms constitute to the health of humans, there is an unrelenting search underway to fiind new and better drugs to control these parasites.

The componds of this invention, the benzonitrile oxides and the terephthalonitrile dioxides, have been shown to exhibit unexpected biological activity and more particularly they exhibit anthelminthic properties. This permits their application in therapeutics, veterinary medicine, industry and agriculture.

The benzonitrile oxides which contain o,o'-disubstitution are preferred for their increased stability. Such compounds are the 2,6-disubstituted benzonitrile oxides.

The compounds of this invention are prepared from aryl oximes by reacting at least equimolar amounts of the oxime and alkali hypohalite at from $-10°$ C. to $+25°$ C. Although a 1:1 molar ratio has been found to be adequate, ratios of 5:1, alkali hypohalite to oxime, have been found to react efficiently. The hypohalite, which is added dropwise to the oxime as an aqueous solution, can be sodium hypobromite or sodium hypochlorite. After addition is complete, the mixture is usually stirred at room temperature for 24 hours. However, shorter stirring times are found to be sufficient to react the hypohalite with the oxime. The starting materials for the reaction described are commercially available or may be readily prepared from porcedures well known in the art. The compounds are prepared from the oximes of aromatic aldehydes in accordance with the following equation:

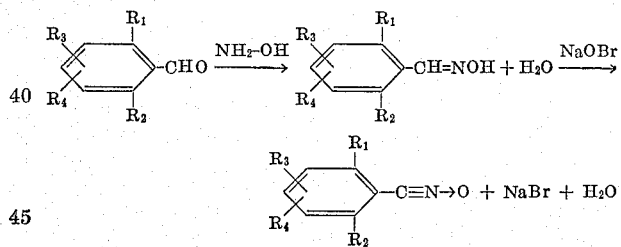

The reaction of chlorine with the aldoxime to obtain the hydroxamic chloride followed by treatment with aqueous sodium hydroxide or triethylamine serves as an alternate route to the compounds of this invention. The chlorination of the oxime is accomplished by reacting 0.05 mole of the oxime with chlorine gas in 8 N hydrochloric acid at $+10°$ C. to $-10°$ C. The resulting chloride is filtered and dried. The chloride is then reacted with aqueous sodium hydroxide by the dropwise addition of a 10 to 20% solution to a cold solution of the chloride or by the dropwise addition of triethylamine to an ethanolic solution of the dichloride at from $-10$ to $+10°$ C. Molar ratios of base to chloride of 1:1 and 5:1 are found to be effective. The reaction is in accordance with the following equation:

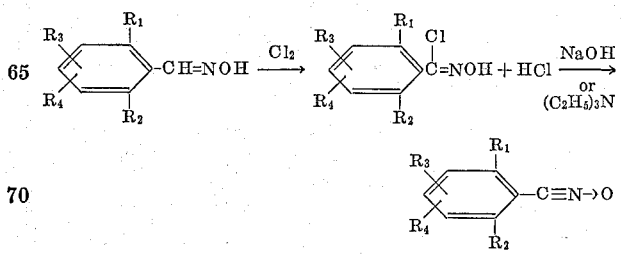

Terephthalonitrile dioxide has been successfully prepared by this process as well as by the hypohalide process.

The compounds of this invention display the addition reactions of nitrile oxides toward hydrogen halides, olefinic and acetylenic double bonds and primary and secondary amino groups. The compounds are inert to alcoholic hydroxy and ester groups. Most of the compounds are water-insoluble but soluble in organic solvents such as ethyl alcohol and ethyl acetate.

The compounds are administered to infected subjects by the oral or by the parenteral route. In the treatment of helminthic infection, the oral route is preferred.

The tests in the following table indicate the utility of the compounds of this invention as anthelminthic agents. These tests were conducted on mice infected with *H. nana* and *S. obvelata*. Various concentrations of the compounds were dispersed in water and administered orally in three doses at 24 hour intervals. The table shows the effectiveness of the compounds. Similar results are obtained with other compounds within the scope of this invention.

TABLE I

| Compound | Dose (mg./kg.) Three at 24 hr. Intervals | No. Mice Cleared/ No. Mice Infected | |
|---|---|---|---|
| | | *H. nana* | *S. obvelata* |
| 2,4,6-Trimethoxybenzonitrile Oxide | 500 | 8/8 | 4/8 |
| | 250 | 4/4 | 0/4 |
| | 125 | 8/8 | 0/8 |
| | 62.5 | 4/9 | 0/4 |
| 2,4,6-Trimethylbenzonitrile Oxide | 500 | 7/7 | 4/7 |
| | 125 | 7/8 | 0/8 |
| | 31.25 | 8/8 | 0/8 |
| | 15.625 | 0/4 | 0/4 |

For therapeutic use, an oral dose of 25 to 300 mg./kg. is recommended. Ordinarily a single dose is sufficient but in the event multiple doses are employed, this dose may be repeated on two or three consecutive days. The oral route may be employed by mixing the effective ingredient with emulsifying agents and employing a drench solution which is squirted down the throat of the animal so that the recommended level is reached in the animal.

Tablets, capsules and boluses can also be used to contact the effective ingredient with the parasites within the animal. In this case, the usual dose ranges from ⅓ to 15 grams for animals weighing from 30 to 1000 pounds. The tablets, capsules and boluses are prepared by conventional means.

Dry mineral mixtures containing the arylnitrile oxides are prepared containing from 0.1 to about 5.0% of the active ingredients mixed with salt (sodium chloride) and other minerals with which it is desired to treat the animal. These mixtures are fed on an ad libitum basis by adjusting the proportion of active ingredient in the mixture to the average daily consumption per animal so as to provide the proper daily dose as specified above.

The material can also be supplied to the animal by mixtures of 0.1 to about 5.0% of the arylnitrile oxide admixed with feed. The daily dose of anthelminthic is usually mixed with only a portion of the animal's daily allotment to insure complete consumption of the dose.

It should be noted that the compounds may be administered either alone or in combination with pharmaceutically acceptable carriers and diluents in both single and multiple dosages. For purposes of oral administration, tablets containing various excipients such as sodium citrate, calcium carbonate and dicalcium phosphate are used. Bonding agents such as polyvinylpyrrolidone, sucrose, gelatin and acacia together with disintegrants such as starch, alginic acid and certain complex silicates may be used. In addition, lubricating agents such as magnesium stearate, sodium lauryl sulfate and talc are often useful for tableting purposes. Solid compositions of a similar type may also be employed as fillers in soft elastic and hard-filled gelatin capsules. Preferred materials include lactose and high molecular weight polyethylene glycols.

When aqueous suspensions are desired, the essential active ingredient is combined with emulsifying and/or suspending agents, together with such diluents as ethanol, propylene glycol, glycerine and various like combinations thereof.

For parenteral administration, solutions or suspensions of the arylnitrile oxides in methyl stearate or other completely saturated vegetable oils may be employed. Aqueous solutions of water-soluble arylnitrile oxides may also be used for parenteral administration. Such aqueous solutions should be suitably buffered if necessary, and the liquid diluent rendered isotonic with sufficient saline or glucose.

The invention is further illustrated by the following examples. It should be understood that various other embodiments, modifications and equivalents may be used without departing from the spirit or the scope of this inveniton.

EXAMPLE I

*2,4,6-trimethylbenzonitrile oxide*

To 2,4,6-trimethylbenzaldoxime (3.3 g., 20 mmoles), dissolved in 40 ml. of 2 N sodium hydroxide, is added dropwise an aqueous solution containing 1.49 g. (20 meq.) of sodium hypochlorite at 0° C. so that the temperature does not exceed 10° C. After the addition is complete, the mixture is stirred at room temperature for 24 hours. The 2,4,6-trimethylbenzonitrile oxide precipitate is filtered, washed with water and recrystallized from a mixture of ethanol and water. The dried product melts at 114° C.

EXAMPLE II

*2,4,6-trimethoxybenzonitrile oxide*

To 2,4,6-trimethoxybenzoaldoxime (4.2 g., 0.02 mole) dissolved in 60 ml. of 2 N sodium hydroxide, is added dropwise an aqueous solution of 2.37 g. (20 meq.) of sodium hypobromite at 0° C. The mixture is stirred at room temperature for 24 hours. The 2,4,6-trimethoxybenzonitrile oxide precipitate is filtered, washed with water and recrystallized from a mixture of ethanol and water. The dried product melts with decomposition at 160–170° C.

Additional substituted benzonitrile oxides prepared by the procedure of Example II employing suitable benzaldoximes are:

2,3-dimethoxybenzonitrile oxide
2-methoxy-3-n-propylbenzonitrile oxide
2-methyl-3-isopropylbenzonitrile oxide
2,4-dimethylbenzonitrile oxide
2,4-dimethoxybenzonitrile oxide
2,4-di-n-propoxybenzonitrile oxide
2,5-dimethoxybenzonitrile oxide
2,5-di-n-propylbenzonitrile oxide
2,5-dimethylbenzonitrile oxide
2,5-diethylbenzonitrile oxide
2,6-dimethylbenzonitrile oxide
2,6-dimethoxybenzonitrile oxide
2,6-di-n-propylbenzonitrile oxide
2,4,6-triethoxybenzonitrile oxide
2,4,6-trimethylbenzonitrile oxide
2,4-diethyl-6-methylbenzonitrile oxide
2,3,4,5-tetramethylbenzonitrile oxide
2,3,4,5-tetramethoxybenzonitrile oxide
2-methyl-3,4,5-trimethoxybenzonitrile oxide
2,3,4,5-tetra-n-propoxybenzonitrile oxide
2,3,4-trimethyl-6-ethylbenzonitrile oxide
2,3,4,6-tetraethoxybenzonitrile oxide
2,3,4,6-tetra-n-propoxybenzonitrile oxide
2,3,5-trimethylbenzonitrile oxide
2,3,5-trimethoxybenzonitrile oxide
2,6-di-n-propyl-3-methylbenzonitrile oxide
2,3,6-trimethylbenzonitrile oxide
2,3,6-trimethoxybenzonitrile oxide
2,4,5-trimethylbenzonitrile oxide 2,4,5-trimethoxybenzonitrile oxide
2,4,5-triethoxybenzonitrile oxide
2,4,5-tri-n-propylbenzonitrile oxide
2,4,6-trimethoxybenzonitrile oxide
2,3,5,6-tetramethylbenzonitrile oxide (M.P. 120° C.)
2,3,5,6-tetramethoxybenzonitrile oxide
2-methylbenzonitrile oxide
2-ethylbenzonitrile oxide
2-methoxybenzonitrile oxide
2-isopropylbenzonitrile oxide
2-n-propoxybenzonitrile oxide
2-n-propylbenzonitrile oxide
2-methyl,3-n-propyl,4-ethyl,6-isopropylbenzonitrile oxides
2-methyl,3-ethyl,4-ethoxy,6-isopropylbenzonitrile oxides
2-ethyl,3-ethoxy,4-isopropoxy,6-methylbenzonitrile oxides
2-n-propyl,3-ethyl,4-methyl,6-isopropylbenzonitrile oxides
2-n-propoxy,3-ethoxy,4-methoxy,6-methylbenzonitrile oxides
2-methoxy,3-ethoxy,4-n-propoxy,6-isopropoxybenzonitrile oxides
2-methyl,3-n-propyl,5-ethyl,6-isopropylbenzonitrile oxides
2-ethyl,3-n-propyl,5-methyl,6-isopropylbenzonitrile oxides
2-ethoxy,3-methyl,5-ethyl,6-isopropylbenzonitrile oxides
2-methyl,3-methoxy,5-ethyl,6-n-propylbenzonitrile oxides
2-n-propyl,3-methoxy,5-ethoxy,6-n-propylbenzonitrile oxides
2-methoxy,3-ethoxy,5-ethyl,6-n-propylbenzonitrile oxides
2-methoxy,3-methyl,5-ethoxy,6-methylbenzonitrile oxides
2-methyl,3-methoxy,5-ethoxy,6-n-propylbenzonitrile oxides
2-methoxy,3-ethoxy,5-isopropoxy,6-n-propoxybenzonitrile oxides
2-ethoxy,3-methoxy,5-isopropoxy,6-n-propoxybenzonitrile oxides

EXAMPLE III

*2,3,5,6-tetramethylterephthalonitrile dioxide*

To 2,3,5,6-tetramethylterephthalic aldehyde oxime (5.8 g., 0.02 mole), dissolved in 60 ml. of 2 N sodium hydroxide, is added dropwise an aqueous solution of 4.74 g. (40 meq.) of sodium hydrobromite at 0° C. The mixture is then stirred at room temperature for 24 hours, the product is filtered, washed with water and recrystalized from a dimethylformamide-water mixture. The product melts at 169–170° C.

Similarly, additional substituted terephthalonitrile dioxides are prepared employing suitable terephthalic aldehyde oximes:

2,3,5,6-tetramethylterephthalonitrile dioxide
Terephthalonitrile dioxide
2,3,5,6-tetramethoxyterephthalonitrile dioxide
2,3-di-n-propoxyterephthalonitrile dioxide
2,3-dimethoxyterephthalonitrile dioxide
2-methoxy-3-n-propoxyterephthalonitrile dioxide
2-methyl-3-isopropylterephthalonitrile dioxide
2,5-di-isopropylterephthalonitrile dioxide
2,5-dimethoxyterephthalonitrile dioxide
2,5-di-n-propylterephthalonitrile dioxide
2,5-dimethylterephthalonitrile dioxide
2,5-diethylterephthalonitrile dioxide
2,6-dimethylterephthalonitrile dioxide
2,6-dimethoxyterephthalonitrile dioxide
2,6-di-n-propylterephthalonitrile dioxide
2,6-di-n-propyl-3-methylterephthalonitrile dioxide
2,3-6-trimethylterephthalonitrile dioxide
2,3-6-trimethoxyterephthalonitrile dioxide
2,3-6-triethylterephthalonitrile dioxide
2,3-6-tri-n-propylterephthalonitrile dioxide
2,3-di-isopropyl-6-methylterephthalonitrile dioxide
2,3,5,6-tetraethoxyterephthalonitrile dioxide
2,3,5,6-tetra-n-propylterephthalonitrile dioxide
2,3-di-n-propoxy-5,6-diethylterephthalonitrile dioxide
2-ethyl-3-methyl,5-n-propyl,6-isopropylterephthalonitrile dioxide
2-methyl,3-ethyl,5-isopropyl,6-n-propylterephthalonitrile dioxide
2-methyl,3-ethoxy,5-n-propyl,6-isopropylterephthalonitrile dioxide
2-methyl,3-ethoxy,5-n-propoxy,6-isopropylterephthalonitrile dioxide
2-n-propyl,3-ethoxy,5-methoxy,6-isopropoxyterephthalonitrile dioxide
2-methoxy,3-ethoxy,5-n-propoxy,6-isopropoxyterephthalonitrile dioxide
2-n-propoxy,3-ethoxy,5-isopropoxy,6-n-propoxyterephthalonitrile dioxide

EXAMPLE IV

Three doses, at 24 hour intervals, of 2,4,6-trimethylbenzonitrile oxide as an aqueous suspension, were administered to mice infected with *H. nana* parasites so that each dose was equivalent to 31.25 mg./kg. The compound was found effective in clearing eight of the eight mice infected.

EXAMPLE V

When the following compounds are tested in a manner similar to that of Example IV, they are also found to be effective anthelminthic agents:

2,3,5,6-tetramethylterephthalonitrile dioxide
Terephthalonitrile dioxide
2,3,5,6-tetramethoxyterephthalonitrile dioxide
2,3-di-n-propoxyterephthalonitrile dioxide
2,3-dimethoxyterephthalonitrile dioxide
2-methoxy-3-n-propoxyterephthalonitrile dioxide
2-methyl-3-isopropylterephthalonitrile dioxide
2,5-di-isopropylterephthalonitrile dioxide
2,5-dimethoxyterephthalonitrile dioxide
2,5-di-n-propylterephthalonitrile dioxide
2,5-dimethylterephthalonitrile dioxide
2,5-diethylterephthalonitrile dioxide
2,6-dimethylterephthalonitrile dioxide
2,6-dimethoxyterephthalonitrile dioxide
2,6-di-n-propylterephthalonitrile dioxide
2,3-dimethoxybenzonitrile oxide
2-methoxy-3-n-propylbenzonitrile oxide
2-methyl-3-isopropylbenzonitrile oxide
2,4-dimethylbenzonitrile oxide
2,4-dimethoxybenzonitrile oxide
2,4-di-n-propoxybenzonitrile oxide
2,5-dimethoxybenzonitrile oxide
2,5-di-n-propylbenzonitrile oxide
2,5-dimethylbenzonitrile oxide
2,5-diethylbenzonitrile oxide
2,6-dimethylbenzonitrile oxide
2,6-dimethoxybenzonitrile oxide
2,6-di-n-propylbenzonitrile oxide
2,4,6-triethoxybenzonitrile oxide
2,4,6-trimethylbenzonitrile oxide
2,4-diethyl-6-methylbenzonitrile oxide
2,3,4,5-tetramethylbenzonitrile oxide
2,3,4,5-tetramethoxybenzonitrile oxide
2-methyl-3,4,5-trimethoxybenzonitrile oxide
2,3,4,5-tetra-n-propoxybenzonitrile oxide
2,3,4-trimethyl-6-ethylbenzonitrile oxide
2,3,4,6-tetraethoxybenzonitrile oxide
2,3,4,6-tetra-n-propoxybenzonitrile oxide
2,3,5-trimethylbenzonitrile oxide
2,3,5-trimethoxybenzonitrile oxide
2,6-di-n-propyl-3-methylbenzonitrile oxide
2,3,6-trimethylbenzonitrile oxide
2,3,6-trimethoxybenzonitrile oxide
2,4,5-trimethylbenzonitrile oxide
2,4,5-trimethoxybenzonitrile oxide
2,4,5-triethoxybenzonitrile oxide
2,4,5-tri-n-propylbenzonitrile oxide
2,4,6-trimethoxybenzonitrile oxide
2,3,5,6-tetramethylbenzonitrile oxide (M.P. 120° C.)
2,3,5,6-tetramethoxybenzonitrile oxide 2-methylbenzonitrile oxide
2-ethylbenzonitrile oxide
2-methoxybenzonitrile oxide
2-isopropylbenzonitrile oxide
2-n-propoxybenzonitrile oxide
2-n-propylbenzonitrile oxide
2,6-di-n-propyl-3-methylterephthalonitrile dioxide
2,3,6-trimethylterephthalonitrile dioxide
2,3,6-trimethoxyterephthalonitrile dioxide
2,3,6-triethylterephthalonitrile dioxide
2,3,6-tri-n-propylterephthalonitrile dioxide
2,3-di-isopropyl-6-methylterephthalonitrile dioxide
2,3,5,6-tetraethoxyterephthalonitrile dioxide
2,3,5,6-tetra-n-propylterephthalonitrile dioxide
2,3-di-n-propoxy-5,6-diethylterephthalonitrile dioxide
2-methyl,3-n-propyl,4-ethyl,6-isopropylbenzonitrile oxide
2-methyl,3-ethyl,4-ethoxy,6-isopropylbenzonitrile oxide
2-ethyl,3-ethoxy,4-isopropoxy,6-methylbenzonitrile oxide
2-n-propyl,3-ethyl,4-methyl,6-isopropylbenzonitrile oxide
2-n-propoxy,3-ethoxy,4-methoxy,6-methylbenzonitrile oxide
2-methoxy,3-ethoxy,4-n-propoxy,6-isopropoxybenzonitrile oxide
2-methyl,3-n-propyl,5-ethyl,6-isopropylbenzonitrile oxide
2-ethyl,3-n-propyl,5-methyl,6-isopropylbenzonitrile oxide
2-ethoxy,3-methyl,5-ethyl,6-isopropylbenzonitrile oxide
2-methyl,3-methoxy,5-ethyl,6-n-propylbenzonitrile oxide
2-n-propyl,3-methoxy,5-ethoxy,6-n-propylbenzonitrile oxide
2-methoxy,3-ethoxy,5-ethyl,6-n-propylbenzonitrile oxide
2-methoxy,3-methyl,5-ethoxy,6-methylbenzonitrile oxide
2-methoxy,3-methoxy,5-ethoxy,6-n-propylbenzonitrile oxide
2-methoxy,3-ethoxy,5-isopropoxy,6-n-propoxybenzonitrile oxide
2-ethoxy,3-methoxy,5-isopropoxy,6-n-propoxybenzonitrile oxide
2-ethyl,3-methyl,5-n-propyl,6-isopropylterephthalonitrile dioxide
2-methyl,3-ethyl,5-isopropyl,6-n-propylterephthalonitrile dioxide
2-methyl,3-ethoxy,5-n-propyl,6-isopropylterephthalonitrile dioxide
2-methyl,3-ethoxy,5-n-propoxy,6-isopropylterephthalonitrile dioxide
2-n-propyl,3-ethoxy,5-methoxy,6-isopropoxyterephthalonitrile dioxide
2-methoxy,3-ethoxy,5-n-propoxy,6-isopropoxyterephthalonitrile dioxide
2-n-propoxy,3-ethoxy,5-isopropoxy,6-n-propoxyterephthalonitrile dioxide

EXAMPLE VI

Terephthalonitrile dioxide

To an ethanolic solution of p-benzenedihydroxamic acid dichloride (9.3 g., 40 mmoles) is added dropwise 40 mmoles of triethylamine at 0° C. The mixture is stirred for 24 hours at room temperature. The resulting suspension is filtered and recrystallized from ethanol. The product melts at 160° C.

EXAMPLE VII

Tablets and boluses

A convenient tablet size is one containing 100 mg. of the drug. Such tablets are prepared by thoroughly blending 250 g. of the 2,4,6-trimethylbenzonitrile oxide and 50 g. of starch in a twin shell blender. The blended powders are then mixed with sufficient ethanol to make an easily manipulated paste which is extruded through a 10-mesh screen to provide granules which are dried in vacuo until all the solvent is removed. The granules are coated with magnesium stearate by briefly blending with 2% the total weight of granules of that substance. This mixture is then fed to a tableting press to produce tablets containing 100 mg. of the drug in addition to proportionate quantities of the carriers and excipients listed above. For animals, the daily dose varies from ⅓ to 15 grams depending on the weight of the animal. Boluses of various sizes can be prepared in the same fashion by selecting dies of an appropriate size. A complete daily dose of 15 grams can be incorporated into a single bolus.

EXAMPLE VIII

Capsules

The arylnitrile oxides are conveniently encapsulated in hard gelatin capsules. For therapeutic use, from 250 mg. to 1 gram can be contained in a single capsule. It is convenient to mix an arylnitrile oxide such as terephthalonitrile dioxide with tricalcium phosphate at 15 to about 50% of the weight of drug. Thus, 2 parts by weight of the drug are blended with one part by weight of tricalcium phosphate in a twin shell blender. The powder is then subdivided and loaded into hard gelatin capsules so that each capsule contains 250 mg. of active ingredient.

EXAMPLE IX

Feed mixtures

A therapeutic dose of 2,4,6-trimethylbenzonitrile oxide varies from 25 to 300 mg./kg. of animal. Assuming a 1000 pound cow consumes 10 pounds of feed supplement per day, about 1 pound of drug per ton of feed would be incorporated. Depending on the total daily feed consumption and the dosage employed, the proportion of drug to feed would vary from 0.1 to 5.0% on a weight basis.

EXAMPLE X

Mineral mixtures

One part by weight of 2,4,6-trimethoxybenzonitrile oxide is mixed with 19 parts by weight of granular sodium chloride. The mixture is thoroughly blended and fed to animals in such quantities so as to provide the recommended daily dose.

What is claimed is:

1. A process for the veterinary control of helminthiasis which comprises administering to an animal an effective amount of a compound selected from the group consisting of those having the formulae:

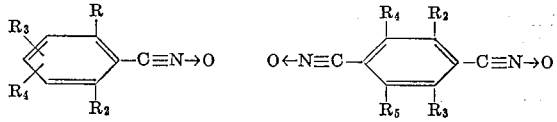

wherein $R_1$ is selected from the group consisting of alkyl having from 1 to 3 carbon atoms and alkoxy having from 1 to 3 carbon atoms;

$R_2$, $R_3$, $R_4$ and $R_5$ are each selected from the group consisting of hydrogen, alkyl having from 1 to 3 carbon atoms and alkoxy having from 1 to 3 carbon atoms.

2. A process for the veterinary control of helminthiasis which comprises administering to an animal an effective amount of a compound having the formula:

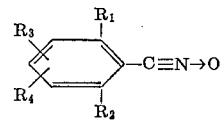

wherein $R_1$ is selected from the group consisting of alkyl having from 1 to 3 carbon atoms and alkoxy having from 1 to 3 carbon atoms;

$R_2$, $R_3$ and $R_4$ are each selected from the group consisting of hydrogen, alkyl having from 1 to 3 carbon atoms and alkoxy having from 1 to 3 carbon atoms.

3. A process for the veterinary control of helminthiasis which comprises administering to an animal an effective amount of a compound having the formula:

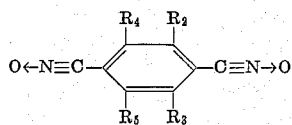

wherein $R_2$, $R_3$, $R_4$ and $R_5$ are each selected from the group consisting of hydrogen, alkyl having from 1 to 3 carbon atoms and alkoxy having from 1 to 3 carbon atoms.

4. The process of claim 1 wherein the compound is administered in dosage unit form.

5. The process of claim 2 wherein the compound is administered in dosage unit form.

6. The process of claim 3 wherein the compound is administered in dosage unit form.

7. A process for the veterinary control of helminthiasis which comprises administering to an animal an effective amount of 2,4,6-trimethylbenzonitrile oxide.

8. A process for the veterinary control of helminthiasis which comprises administering to an animal an effective amount of 2,4,6-trimethoxybenzonitrile oxide.

9. A process for the veterinary control of helminthiasis which comprises administering to an animal an effective amount of 2,3,5,6-tetramethoxyterephthalonitrile dioxide.

References Cited by the Examiner

UNITED STATES PATENTS

| 2,815,363 | 12/1957 | Rorig | 260—465 |
| 3,000,784 | 9/1961 | Todd | 167—53 |
| 3,046,193 | 7/1962 | Parker | 167—53 |
| 3,130,218 | 4/1964 | Cofrancesco | 260—465 |

OTHER REFERENCES

Chemical Abstracts, 5th Decennial Index, 1947–1956, vol. 41–50 (sub. indexed p. 1740S).

JULIAN S. LEVITT, *Primary Examiner.*

N. G. MANN, *Assistant Examiner.*